Jan. 23, 1945.　　　　　J. R. EASH　　　　　2,368,010

WEIGHING SCALE

Filed April 2, 1942

INVENTOR.
JOHN R. EASH
BY Orton and Griswold
ATTORNEYS

Patented Jan. 23, 1945

2,368,010

UNITED STATES PATENT OFFICE 2,368,010

WEIGHING SCALE

John R. Eash, Rutland, Vt., assignor to The Howe Scale Company, Rutland, Vt., a corporation of Vermont Application April 2, 1942, Serial No. 437,304

5 Claims. (Cl. 265—62)

This invention relates to weighing scales and more particularly to scales of the kind in which a rack is moved, say, by the steelyard rod and in turn effects movement of one of two relatively movable indicating devices such as a pointer moving over the face of a dial or a transparent graduated indicator movable with respect to an index. More particularly, the invention relates to scales of the kind known as pendulum scales.

It is common experience that all scales and more particularly automatic or self-indicating scales frequently change so-called "zero balance" and vary in the degree of accuracy of the weight indication when moved from one location (after adjustment) to another location even on the same floor because the level, that is, the inclination of the floor, varies from place to place.

The primary object of this invention is to automatically correct for a change in zero balance and maintain the original zero balance indication even though the scale, say, a scale on wheels, be thrown out of level when moved from a location at which the floor is of one inclination to another location at which the floor is of a different inclination.

Another object of the invention is an instrumentality to effect correction for zero balance which is readily applicable to any type of so-called automatic or self-indicating scales.

The invention also seeks, correcting devices for zero balance which are practical from the standpoint of convenience of installation and simplicity and accuracy in use.

These and other objects of the invention and the means for their attainment will be more apparent from the following detailed description, taken in connection with the accompanying drawing illustrating one embodiment by which the invention may be realized and in which.

Figure 1:
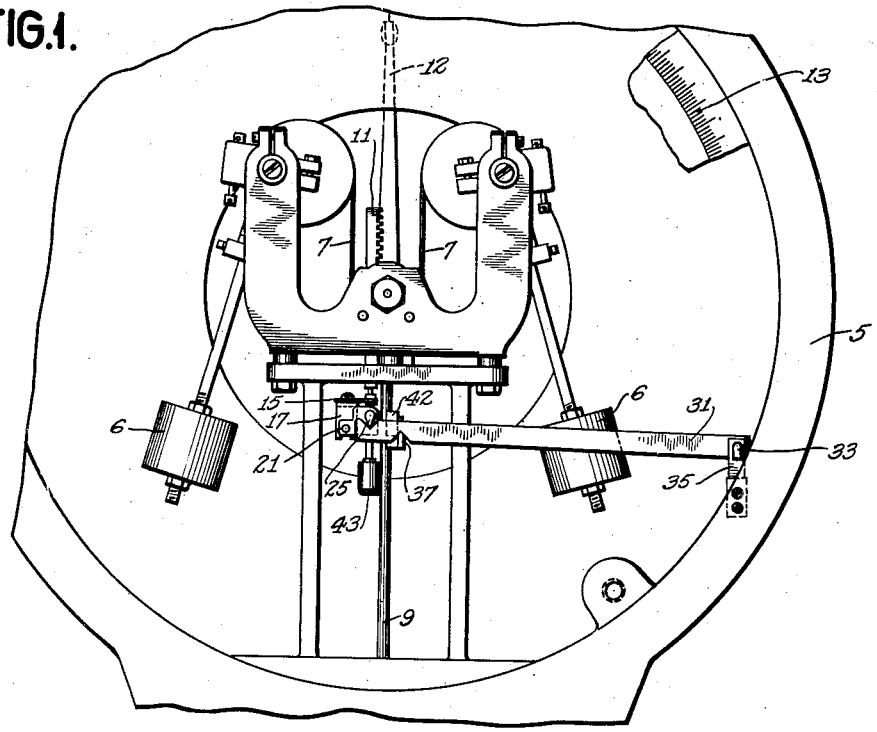
Figure 1 is a view in front elevation showing the dial housing of a scale containing automatic load counterbalancing mechanism to which the invention is applied.

Referring first to Figure 1, the dial housing 5, as will be understood, surmounts a column (not shown) in which is disposed a rod connecting the tare beam with the platform supporting levers in the base (not shown). The load counter-balancing mechanism is shown as consisting of a pair of pendulums 6 connected by means of metallic ribbons 7 and rod 9 to the tare beam (not shown) which is connected, say, to the platform supporting levers in a manner common to the art. Connected to the load counterbalancing mechanism by a pinion (not shown) and a rack 11 is an indicator 12 which swings over a chart 13 suitably graduated to indicate the load on the scale.

Figure 2:
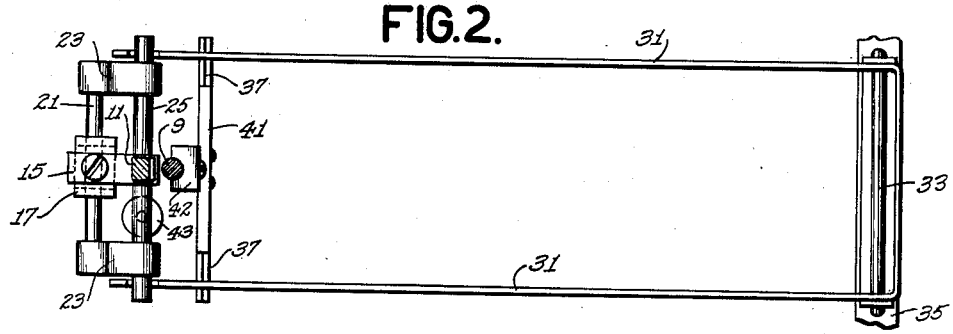
Figure 2 is a fragmentary plan view showing the correcting devices of this invention.
Figure 3:
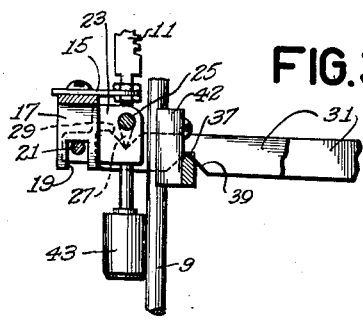
Figure 3 is a view, on an enlarged scale showing, in side elevation, the structure at the left hand end of Figure 2.

As shown in Figures 2 and 3, the rack 11 carries at its lower end a plate 15 which extends to the left, as viewed, and carries a rack foot 17 forked at its lower end, as at 19, to straddle and be supported on a transversely extending pin 21. Thus the rack is supported on the pin 21 through the instrumentality of the plate 15 and the rack foot 17. The pin 21 extends between spaced brackets 23 rigidly carried by a bar 25 parallel to and in spaced relation to the pin 21 and passing through the brackets to extend therebeyond. The bar is formed, at least outwardly of the brackets, with knife edges 27 fulcrumed in notches 29 in the upper edge of the U-shaped substantially horizontally disposed rack-arm 31.

The rack-arm 31 is pivotally supported at its end remote from the rack rod 9, as on knife edge 33 mounted on a frame 35 conveniently supported, say, on the dial housing 5. The rack-arm is also pivotally supported proximate the vertical plane of the rack, as by knife edges 37 received, say, in notches 39 formed in the parallel members of the rack-arm 31. The knife edges 37 are conveniently formed on a transverse bar 41 secured, as by a bracket 42, on the rod 9.

Rigidly fixed to the rod 25 and conveniently intermediate the ends thereof, is a counterweight or pendulum 43, which normally hangs vertically thereby causing the pin 21 to apply upward pressure to or relieve upward pressure from the rack foot 17. This pendulum 43 is rigidly fixed to the bar 25.

When the scale is standing on a surface which is not level, the pendulums 6, in tending to assume a vertical position, will cause the pointer 12 to move slightly to one side or the other of the exact zero position. However, with this invention the pendulum 43 also tends to assume a vertical position and counteracts this tendency. Thus, if the scale is tipped even slightly to, say, the left of vertical, the pendulums 6 will both swing toward the left, causing the pointer 12 to move slightly off the zero indication to the left. Of course, when a load is on the platform, the pointer 12 also, in this situation, will be slightly to the left of the graduation giving the correct reading. However, with this invention, the pendulum 43 also swings to the left through the same angle as the pendulums 6. This will result in upward pressure by the pin 21 on the rack foot since it will rock the bar 25 about its fulcrum in a clockwise direction, as viewed. This movement will raise the rack foot 17 and, if the parts are correctly proportioned, the rack foot will be raised a distance sufficient to cause the pointer 12 to move to the right and return to correct reading position. Again, if the scale is on such a surface that it is tipped to the right, the pointer 12 will be off correct reading position a distance to the right. In this instance, the pendulum 43 will swing to the right moving the pin 21 downwardly a sufficient distance so that, by its linkage with the rack 11, the rack foot 17 will be permitted to move downwardly that distance necessary to bring the indicator back to its correct reading position.

It will thus be seen that an instrumentality is provided in which the tendency in scales provided with indicating hands to change zero balance is overcome and correct balance is afforded at all times.

While a weighing scale is illustrated of a particular automatic or self-indicating type, it will be apparent that the invention is equally applicable to any scale in which the movement of the indicating hand is influenced by gravity.

Various modifications will occur to those skilled in the art in the structural forms taken by the component elements of this invention as well as the points of application of the acting and counteracting forces or in a reversal of the parts and no limitation is intended by the phraseology of the foregoing description or illustrations in the accompanying drawing except as indicated in the appended claims.

What is claimed is:

1. Zero balance correcting devices for weighing scales comprising, in combination, a steelyard rod, a rack arm extending transversely of the steelyard rod, means to pivotally mount said rack arm at one end on a fixed part of the scale, at least one bracket on the steelyard rod, said rack arm being fulcrumed intermediate its ends on the steelyard rod bracket, a second bracket, means pivotally mounting the second bracket on the rack arm, a pendulum fixed to the pivotal mounting means for the second bracket, a rack foot and a rack supporting pin supported in said second bracket in laterally offset relation to the pivotal axis of the second bracket and adapted to engage the rack foot.

2. Zero balance correcting devices for weighing scales comprising, in combination with a steelyard rod, a U-shaped rack arm extending transversely of the steelyard rod, means to pivotally mount said rack arm at one end on a fixed part of the scale and means to fulcrum the arms intermediate their ends on the steelyard rod, at least one bracket, means pivotally mounting the bracket on the rack arm, a pendulum fixed to the pivotal mounting, a rack foot carried by the bracket in laterally offset relation from the axis on which the bracket is pivoted to the rack arm, and a rack supporting pin supported on the bracket and adapted to engage the rack foot.

3. Zero balance correcting devices for weighing scales comprising, in combination with a steelyard rod, a rack arm comprising laterally spaced frame members extending transversely of the steelyard rod, means to pivotally mount said rack arm at one end on a fixed part of the scale, a knife-edge carried by the steelyard rod on which the rack arm is fulcrumed intermediate its ends, spaced bracket means, pivot means extending between the spaced bracket means and by which the bracket means are pivoted on the opposite side of the fulcrum from the pivotal mounting of the rack arm, a rack supporting means carried by the bracket means offset laterally from the pivotal axis of the bracket and a pendulum fixed to the bracket means.

4. Zero balance correcting devices for weighing scales, comprising in combination with a steelyard rod, arm means fulcrumed on the steelyard rod, means to pivotally mount said arm means on a fixed part of the scale, bracket means pivotally mounted on the arm means in offset relation to said fulcrum, means to maintain the level of the bracket means, and operative connections between the bracket means and the rack.

5. Zero balance correcting devices for weighing scales comprising, in combination with a rack actuating the indicator and a steelyard rod, a U-shaped rack arm pivotally mounted at one end on the scale housing, a transverse bar carried by the steelyard rod and formed at its ends with knife-edges on which the rack arm is fulcrumed remote from its pivotal mounting, spaced bracket means, a knife-edge carried by each bracket means and supported by the free ends of the rack arm, a rack supporting pin carried by the bracket means on the opposite side of the last mentioned knife-edges from the steelyard rod, a rack foot supported on the supporting pin, and means to maintain the level of the bracket means.

JOHN R. EASH.